United States Patent
Lilliott et al.

(10) Patent No.: US 7,765,456 B1
(45) Date of Patent: Jul. 27, 2010

(54) OPTIMAL MULTI-USER ORTHOGONAL VARIABLE SPREADING FACTOR (OVSF) CODE GENERATOR

(75) Inventors: Neil Lilliott, Redhill (GB); Andrew David Laney, Addlestone (GB)

(73) Assignee: Xilinx, Inc., San Jose, CA (US)

( * ) Notice: Subject to any disclaimer, the term of this patent is extended or adjusted under 35 U.S.C. 154(b) by 1255 days.

(21) Appl. No.: 11/095,813

(22) Filed: Mar. 31, 2005

(51) Int. Cl.
  *H03M 13/03* (2006.01)

(52) U.S. Cl. ............... 714/786; 370/208; 375/E1.001; 375/343; 714/E11.042

(58) Field of Classification Search ............ 714/786
  See application file for complete search history.

(56) References Cited

U.S. PATENT DOCUMENTS

| | | | |
|---|---|---|---|
| 6,091,760 A * | 7/2000 | Giallorenzi et al. | 375/140 |
| 6,393,047 B1 * | 5/2002 | Popovic' | 375/140 |
| 6,956,890 B2 * | 10/2005 | Lattuca et al. | 375/140 |
| 7,039,134 B1 * | 5/2006 | Avital et al. | 375/343 |
| 7,134,065 B2 * | 11/2006 | McIntire et al. | 714/762 |
| 2003/0122697 A1 * | 7/2003 | Schooler et al. | 341/173 |
| 2004/0131008 A1 * | 7/2004 | Zuniga et al. | 370/208 |

* cited by examiner

*Primary Examiner*—Scott T Baderman
*Assistant Examiner*—Enam Ahmed
(74) *Attorney, Agent, or Firm*—Thomas A. Ward; John J. King

(57) ABSTRACT

A circuit to generate Orthogonal Variable Spread Factor (OVSF) codes for CDMA systems. The circuit includes a shift register to determine the OVSF code k for a given spread factor SF, wherein k ranges between 0 and (SF−1). A memory cell register stores the leftmost bit of the code that is loaded into the first bit of the shift register. An XOR gate provides an input to the shift register after the first bit is loaded from the memory cell. An address Look Up Table (LUT), or state machine, is connected to the shift register to select a tap output from one of the shift register bits to provide a first input to the XOR gate. A secondary OVSF code register connects to a second input of the XOR gate to provide code bits from lower SF values making up the code from the current SF value.

17 Claims, 5 Drawing Sheets

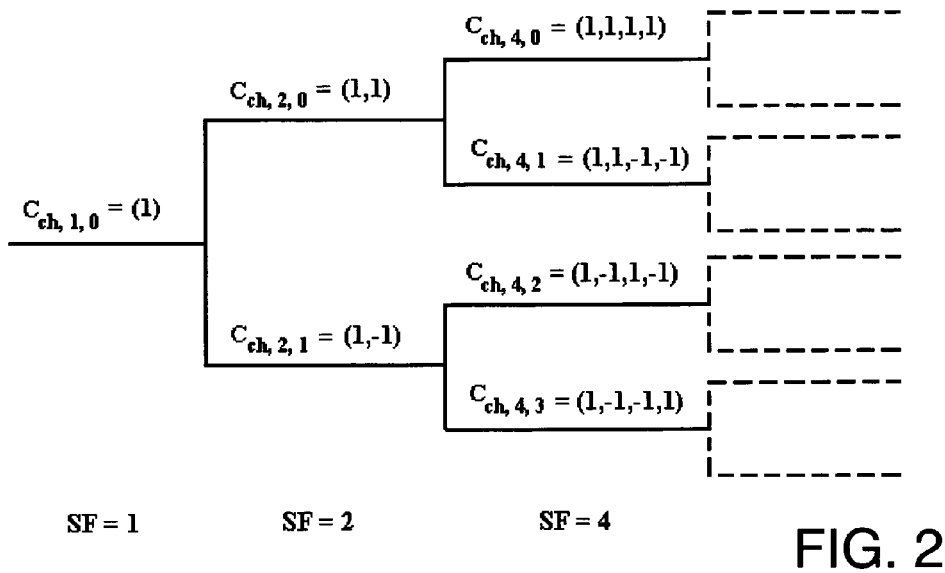

FIG. 2

$C_{ch,1,0} = 1$     FIG. 3A $$\begin{pmatrix} C_{ch,2,0} \\ C_{ch,2,1} \end{pmatrix} = \begin{pmatrix} C_{ch,1,0} & , & C_{ch,1,0} \\ C_{ch,1,0} & , & -C_{ch,1,0} \end{pmatrix} = \begin{pmatrix} 1, & 1 \\ 1, & -1 \end{pmatrix}$$ FIG. 3B $$\begin{pmatrix} C_{ch,2^{(n+1)},0} \\ C_{ch,2^{(n+1)},1} \\ C_{ch,2^{(n+1)},2} \\ C_{ch,2^{(n+1)},3} \\ \vdots \\ C_{ch,2^{(n+1)},2^{(n+1)}-1} \\ C_{ch,2^{(n+1)},2^{(n+1)}-1} \end{pmatrix} = \begin{pmatrix} C_{ch,2^n,0} & , & C_{ch,2^n,0} \\ C_{ch,2^n,0} & , & -C_{ch,2^n,0} \\ C_{ch,2^n,1} & , & C_{ch,2^n,1} \\ C_{ch,2^n,1} & , & -C_{ch,2^n,1} \\ \vdots & & \vdots \\ C_{ch,2^n,2^n-1} & , & C_{ch,2^n,2^n-1} \\ C_{ch,2^n,2^n-1} & , & -C_{ch,2^n,2^n-1} \end{pmatrix}$$ FIG. 3C

| Code (SF=2) | SF=2 | Code Tree |
|---|---|---|
| 0 | + | 1  1 |
| 1 | − | 1  −1 |

FIG. 4A

| Code (SF=4) | SF=2 | SF=4 | Code Tree |
|---|---|---|---|
| 0 | + | + | ▨  ▨  1  1 |
| 1 | + | − | 1  1  −1  −1 |
| 2 | − | + | ▨  ▨  1  −1 |
| 3 | − | − | 1  −1  −1  1 |

FIG. 4B

| Code (SF=8) | SF=2 | SF=4 | SF=8 | Code Tree |
|---|---|---|---|---|
| 0 | + | + | + | ▨  ▨  ▨  ▨  1  1  1  1 |
| 1 | + | + | − | 1  1  1  1  −1  −1  −1  −1 |
| 2 | + | − | + | ▨  ▨  ▨  ▨  1  1  −1  −1 |
| 3 | + | − | − | 1  1  −1  −1  −1  −1  1  1 |
| 4 | − | + | + | ▨  ▨  ▨  ▨  1  −1  1  −1 |
| 5 | − | + | − | 1  −1  1  −1  −1  1  −1  1 |
| 6 | − | − | + | ▨  ▨  ▨  ▨  1  −1  −1  1 |
| 7 | − | − | − | 1  −1  −1  1  −1  1  1  −1 |

FIG. 4C

| Code (SF=8) | SF=2 | SF=4 | SF=8 | Code Tree |
|---|---|---|---|---|
| 0 | + | + | + | 1  1  1  1  1  ▨  1  1 |
| 1 | + | + | − | 1  1  1  1  −1  ▨  −1  −1 |
| 2 | + | − | + | 1  1  −1  −1  1  ▨  −1  −1 |
| 3 | + | − | − | 1  1  −1  −1  −1  ▨  1  1 |
| 4 | − | + | + | 1  −1  1  −1  1  ▨  1  −1 |
| 5 | − | + | − | ▨  ▨  ▨  ▨  ▨  ▨  ▨  ▨ |
| 6 | − | − | + | 1  −1  −1  1  1  ▨  −1  1 |
| 7 | − | − | − | 1  −1  −1  1  −1  ▨  1  −1 |

FIG. 4D

OPTIMAL MULTI-USER ORTHOGONAL VARIABLE SPREADING FACTOR (OVSF) CODE GENERATOR

BACKGROUND

1. Technical Field

The present invention relates to determining OVSF codes. More particularly, the present invention relates to generating OVSF codes by an integrated circuit (IC).

2. Related Art

Orthogonal Variable Spreading Factor (OVSF) codes are used in Code Domain Multiple Access (CDMA) communication systems. For example, the Uniform Mobile Telecommunication System (UMTS) used by Third Generation "3G" mobile (3G/UMTS) uses OVSF to offer mobile telephone operators significant capacity and broadband capabilities to support a greater number of voice and data customers—especially in urban areas. In the 3G/UMTS system, multiple channels are combined and transmitted simultaneously.

In order to be able to recover simultaneously transmitted data in 3G/UMTS, the transmitted symbols are "spread" using the OVSF code. The greater the Spreading Factor (SF) the lower the available symbol transmission rate, but the easier it becomes to recover the data due to the correlation gain at the receiver. The spreading factor will vary on a channel-by-channel basis. For UMTS, the SF can vary between 4 and 512.

For a typical UMTS system, around 128 transmission channels are used but a lot more channels may be available. An example transmission of a single channel is shown in FIG. 1. The symbols "1" and "−1" for transmission are initially shown in FIG. 1. Since multiple channels are typically supported simultaneously by a CDMA communication system, in order to generate the required transmission sequence, multiple OVSF codes are used to carry the symbols from multiple channels. As shown in FIG. 1, one OVSF code (code=5) having an SF=8 is mixed with the symbols from a user to generate the transmitted data sequence for one channel. The OVSF codes generated are mixed with user data as illustrated in FIG. 1 to preserve orthogonality between channels enabling differentiation between a user's different physical channels. In a typical worst case scenario a maximum SF is 512, so 512 OVSF codes of SF=512 are required to mix with a user's channels. If these codes were all stored in memory, 512×512 bits of storage is needed (256 K bits storage).

In order to reduce the memory required by a user in such a UMTS system, it would be desirable to provide minimal circuitry to generate the OVSF codes.

SUMMARY

Embodiments of the present invention perform a relatively small memory implementation of a multi-user OVSF code generator for CDMA systems. Embodiments of the present invention are ideally suited for a Programmable Logic Device (PLD) as they are based around simple counters and shift registers.

According to embodiments of the present invention, a shift register is used to generate at least one OVSF code k for a particular spread factor (SF) value, wherein k ranges between 0 and (SF−1). A memory cell is further included to store the leftmost bit of the code that is loaded into the first bit of the shift register. An XOR gate included in the circuit provides an input to the shift register after the first bit is loaded from the memory cell. An address Look Up Table (LUT), or state machine, is connected to the shift register to select a tap output from one of the shift register bits to provide a first input to the XOR gate. A secondary OVSF code register connects to a second input of the XOR gate to provide code bits indicative of lower SF values making up the code for the particular SF value being generated.

In operation, the leftmost bit from the memory cell is first loaded into the shift register, and the first bit of the shift register is selected by the address LUT as a tap to provide a first input of the XOR gate. The tap bit is multiplied with a rightmost bit of the secondary OVSF code register using the XOR gate to generate an XOR gate output. The output of the XOR gate is loaded into the primary shift register and the bits in the register shifted right after each clock count. The secondary OVSF code register is shifted and the primary code register tap location are changed after predetermined numbers of the clock counts. At a clock count equal to SF−1 for the current code, the primary shift register stores the desired OVSF code generated.

In one embodiment parallel circuits are used to reduce the total number of clock cycles required to generate all the codes for a SF level. The parallel circuits include parallel shift registers, XOR gates and secondary code registers. A state machine serves to control the tap location from the shift registers along with selection of code from the secondary code registers to multiply in the XOR gates. A multiplexer selectively provides the OVSF code bits generated from each individual shift register.

BRIEF DESCRIPTION OF THE DRAWINGS

Further details of the present invention are explained with the help of the attached drawings in which:

FIG. 2 provides a code tree illustrating generation of OVSF codes;

FIGS. 3A-3C illustrate a method for generating channelization codes;

FIGS. 4A-4D provide tables of code for different SF values;

DETAILED DESCRIPTION

Figure 1:
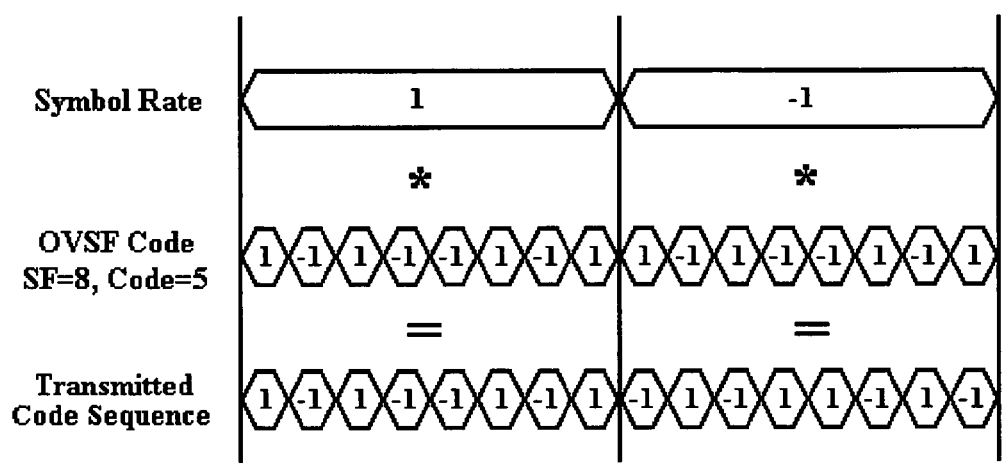
FIG. 1 shows an example transmission of a single channel using an OVSF code.

With embodiments of the present invention, OVSF code is generated with only one bit being required to generate each code (or row) for a particular SF. For example with SF=512 normally requiring a memory of 512×512, with embodiments of the present invention only the nth column is actually required from storage when the nth bit of chip is being calculated for the multiple channels. This means that only 512×1 bits of memory data storage are needed at any one time.

To generate OVSF codes, reference is first made to FIG. 2, which illustrates how OVSF codes are defined as outlined in the 3GPP TS 25.213 specification. In FIG. 2, the channelization codes are uniquely defined as $C_{ch,SF,k}$, where SF is the spread factor of the code and k is the code number, $0 \leq k \leq (SF-1)$. Each level in the code tree defines channelization codes for a different SF value, SF=1, SF=2, SF=4, etc. The total number of codes in each level is SF.

A method for generating OVSF channelization codes using matrices is illustrated in FIGS. 3A-3C. FIG. 3A shows the channelization code for SF=1. FIG. 3B shows the channelization codes for SF=2, along with a matrix defining the channelization codes words in terms of the channelization code for SF=1, and a matrix illustrating the codes for SF=2 in terms of "1s" and "−1s". FIG. 3C then shows the channelization codes for subsequent SF values, SF=$2^{(n+1)}$, where n is an integer value of 1 or greater. FIG. 3C further shows the channelization codes for SF=$2^{(n+1)}$, defined in terms of channelization codes with SF=$2^n$. Note that SF can be 2 to the n power, where n is an integer.

FIGS. 4A-4C provide tables of code for different SF values. FIG. 4A illustrates where SF=2, FIG. 4B shows where SF=4 and FIG. 4C shows where SF=8. Each table in the left most column provides codes k for the SF value, where 0≦k≦SF−1. The right most columns of each table show the "code tree" with rows of "1s" and "−1s" making up the OVSF codes. Finally, the columns following the column of code k values shows a code m values for the current SF value and SF levels down to SF=2. The code m values shown are "+" and "−" values indicating when a code k or row for the particular SF value changes when it is being generated from the base code (SF=1) or '1'. For example, in FIG. 4C the second row (code k=1) of SF=8, is generated in steps of SF=2, code [m=0]='+' giving "+1, +(+1)" or "1, 1", then SF=4, code [m=1]='+' giving "(+1, +1)+(+1, +1)", or "1, 1, 1, 1", then SF=8, code[m=2]='−' giving "(+1, +1, +1, +1)−(+1, +1, +1, +1) or "1, 1, 1, 1, −1, −1, −1, −1".

The hatched lines in the tables FIG. 4B and FIG. 4C illustrate how rows from the code tree of the previous SF level can be generated from the current SF level code tree. As shown in FIG. 4B, the first row, or code k=0 row, the left most columns of the code tree contains "1 , 1" or code k=0 row of SF=2 (FIG. 4A). Furthermore, as shown in FIG. 4B, the third row, or code k=2 row, the left most columns of the code tree contains "1 , −1" or code k=1 row of SF=2 (FIG. 4A). This can be extended to show that any code on SF=a, can be generated from a code of SF>a by extending the code number k by post concatenating zeroes and then selecting the most significant bits of the code. For example, to find code k=3 of SF=4 from SF=8 we take the four most significant bits of code k=6 (or k=3×2) of SF=8.

FIG. 4D repeats the table of FIG. 4C, but changes the hatched lines to illustrate that the OVSF matrix is orthogonal. In other words, for row n=column n in the code tree. This is illustrated by the hatched lines in FIG. 4D showing row 5=column 5. The orthogonal OVSF codes can be mixed with user data in channels as illustrated in FIG. 1 to preserve orthogonality between channels enabling differentiation between a user's different physical channels.

As indicated previously, in accordance with embodiments of the present invention, to determine elements of an OVSF matrix only one bit of the OVSF code is needed for each row. In one embodiment, the leftmost bit value of each code word k, or row is used. The leftmost bit value in each channelization code word, or row, corresponds to the bit transmitted first. In one embodiment, the bit 0 of any code k or row can be indexed by the code number to provide the required bit. In other words, only one code needs to be stored at any one time for each code value. The storage needed for SF of 512 is, thus, 512 bits.

Figure 5:
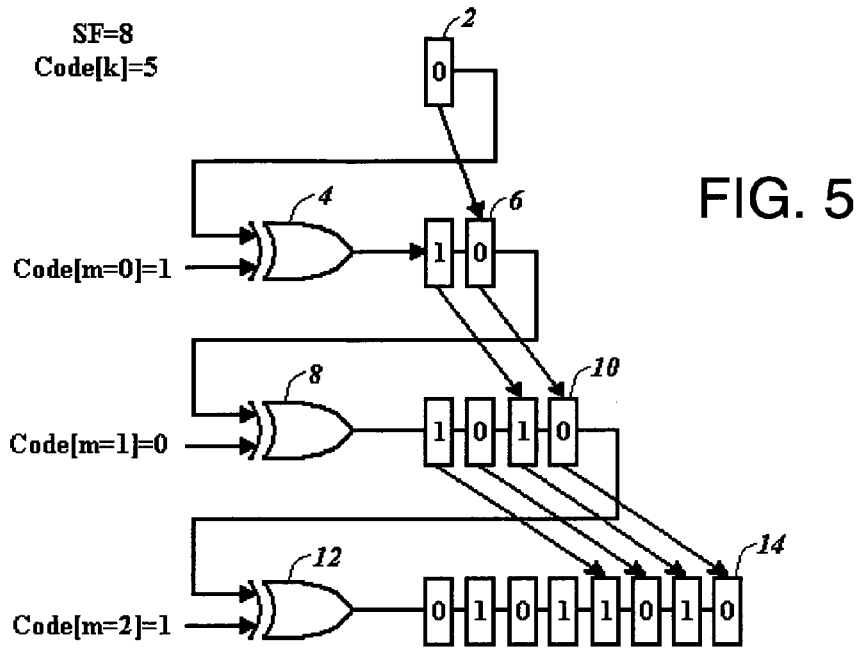
FIG. 5 illustrates how an OVSF code can be generated using XOR logic gates and shift registers.

FIG. 5 illustrates how an OVSF code can be generated using the first code bit (SF=1 or "+1") along with XOR logic gates and shift registers. FIG. 5 illustrates determination of the row for code [k]=5 with a SF=8. The bits are represented with "+1" as "0" and "−1" as "1". The leftmost bit value "0" is initially provided in bit 0 of a shift register 2. The initial "0" is provided from memory storage, as indicated above.

In a further step in FIG. 5, the bit 0 of the shift register 2 is shifted right to bit 1 of register 6 and is also provided as a first input to XOR gate 4. A second input to the XOR gate 4 is provided from a determination of the code[m=0] with code [k=5] and SF=8. Here the code[m=0] is represented by a "1" (see FIG. 4C for SF=2 code k=5 noting that "−" is a "1"). The output of the XOR gate 4 of "1" is then provided into the bit 0 position of the shift register 6.

In a further step in FIG. 5, the bit 0 and bit 1 of the shift register 6 are shifted into bit 2 and bit 3 positions of the register 10, and are further provided as an input to XOR gate 8. A second input to the XOR gate 8 is code[m=1] which is "0" with "+" represented by "0." The resulting outputs from the XOR gate 8 are then shifted into the bit 1 and bit 0 positions of the register 10.

In an additional step in FIG. 5, the bit 0-3 positions of the shift register 10 are shifted into bit 4-7 the positions of the shift register 14, and are further provided as inputs to XOR gate 12. The second input to the XOR gate 12 is code[m=2] which is "1" with "−" represented by "1." The resulting outputs from the XOR gate 12 are shifted into bits 0-3 of the shift register 14. The shift register 14 now contains the bits generated for the row having code [k=5] and SF=8 that comply with the code tree of FIGS. 4C-4D.

Figure 6:
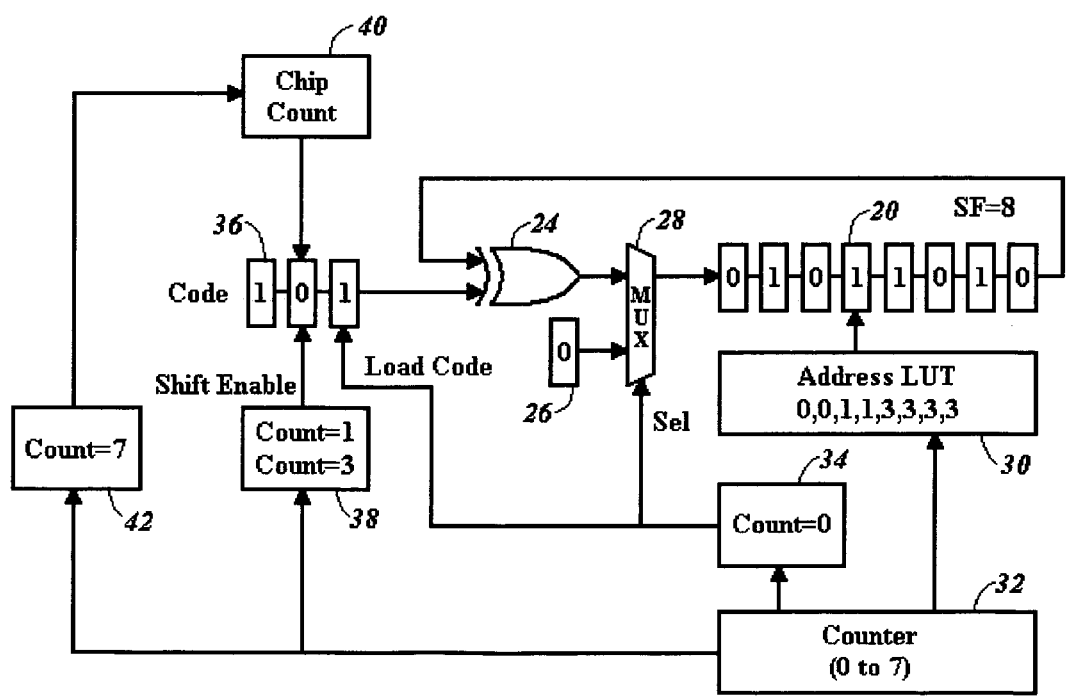
FIG. 6 illustrates a simplified configuration of logic that can be implemented in an FPGA for the circuitry of FIG. 5.

FIG. 6 illustrates a simplified configuration of logic that can be implemented in a Field Programmable Gate Array (FPGA) such as an FPGA from Xilinx, Inc. Of San Jose, Calif., using the circuitry of FIG. 5. As with FIG. 5, circuitry is illustrated for determining OVSF code k=5 with SF=8. In FIG. 6, a single shift register 20 replaces the shift registers 2, 6, 10 and 14 of FIG. 5. Further, a single XOR gate 24 replaces the XOR gates 4, 8 and 12 of FIG. 5. A register, or memory element 26 stores the first, or left most value of the row, similar to register 2 of FIG. 5.

To combine the registers 2, 6, 10 and 14 of FIG. 5 into a single register 20, and to combine XOR gates 2, 6, 10 and 14 into a single XOR gate 24, a multiplexer 28 and address select Look Up Table (LUT) 30 are included. The multiplexer has a select signal input from counter 32 only at count 0 as controlled by block 34 so that on the count 0 the output of the register 26 is provided to the shift register 20, and after count 0 the output of the XOR gate 24 is provided to the shift register 20. The address select LUT 30 functions to select a tap from one of the bits of shift register 20 to provide as an input to the XOR gate 24, depending on the counter 32 value. For the first two counts of counter 32, the bit 0 from shift register 20 is provided as the tap input to the XOR gate 24, for the next two counts bit 1 from shift register 20 is provided as an input to the XOR gate 24, and for the remaining four counts, bit 3 from shift register 20 is provided as an input to the XOR gate 24. This is illustrated by the 0,0,1,1,3,3,3,3 indication on the address LUT 30 which applies for SF=8. With SF having a different value, other combinations of bits are provided from shift register 20 to XOR gate 24 as controlled by the address LUT 30. Similarly, although an eight bit shift register 20 is shown, a shift register having more or less bits can be used. On each count after count 0, the output of the XOR gate 24 is loaded into the first bit of the shift register 20, and the bits of shift register 20 are shifted right. As can be seen, after eight counts, the shift register 20 will store the same value as register 14 of FIG. 5.

The bits of register 36 store the code m values, where m is an integer count of the SF levels from 2 up to the SF level being determined. As illustrated in FIG. 4C, for code 5 and SF=8, the code m values are "−, +, −" which in FIG. 5 translates to "1, 0, 1", the bits stored in register 36. The code m values are loaded into the register 36 on count 0 as controlled by block 34 and counter 32. The code m values can be generated by toggling the register bits from 0 up to a count of the code k value being identified, with toggling occurring as illustrated by the "+" and "−" values in FIG. 4C when codes change for a particular SF value represented by a bit in register 36. The values can similarly be retrieved from a memory. The register 36, although shown as a 3-bit device, can have less or more bits depending on the maximum SF number of the code being generated.

Like shift register 20, register 36 is a shift register. The shift enable signal is provided to the shift register 36 by block 38 as controlled by counter 32. As illustrated by the count=1 and count=3 indicators in block 38, for code k=5 and SF=8, the shift register 36 is shifted right on counts 1 and count 3. The count values in block 38 are the previous SF−1 values (for SF=4 the count is (4−1=3) and for SF=2(2−1=1). The rightmost bit of the shift register 36 is provided as the second input of XOR gate 36. As such, the circuit of FIG. 6 will provide the same input to XOR gate 36 as the code [m=0] to count [m=2] inputs to the XOR gates shown in FIG. 5.

To determine an entire OVSF matrix for an SF level, a determination will be made for each of the codes k, where 0≦k≦(SF−1). Since the code m register 36 will store different initial values for each of the codes k, it will be reloaded after each code k is determined. Thus, in one embodiment, the chip count block 40 is loaded into the register 36 after count 7 from counter 32 as controlled by block 42.

Thus, the OVSF matrix is formed in sequence starting from code k=0 and finishing with code k=SF−1. This provides the transmitted sequence of all codes. For SF=8, each code requires 8 clock cycles. To generate the 8 required codes, 64 clocks cycles are therefore required. Extending this further, to generate the code matrix for code SF requires SF*SF clocks. After all codes are generated, register 36 is automatically reset to code k=0.

Figure 7:
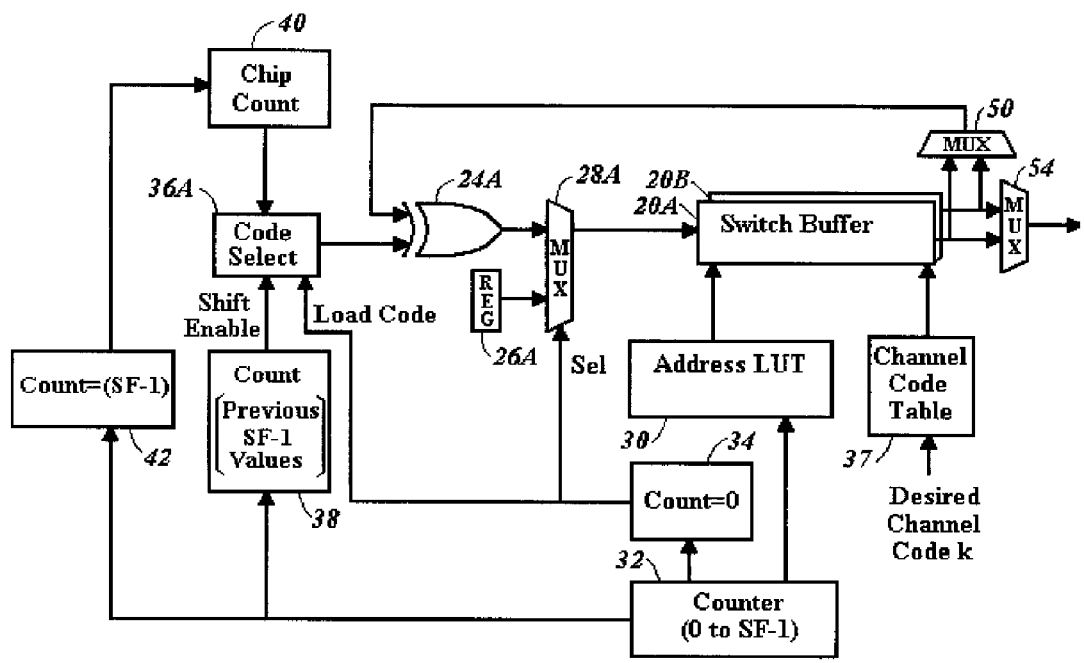
FIG. 7 shows an extension of the structure of FIG. 6 to provide parallel operation.

FIG. 7 shows an extension of the structure of FIG. 6 to provide parallel operation to reduce the total number of clock cycles needed to determine multiple OVSF codes. In addition it also allows the first generated code word to be used, while the second generated code word is generated. In FIG. 7, the shift register 20 of FIG. 6 is replaced with a wide switch buffer made up of two 'n' bit wide shift registers 20A and 20B. Further, the secondary code m register 36 of FIG. 6 is replaced in FIG. 7 with the 'n' bit wide register 36A shown, although more may be included. Furthermore, XOR gate 24, multiplexer 28, and register 26 are replaced by 'n' deep XOR gates 24A, multiplexers 28A, and registers 26A. The switch buffer 20A, 20B, register 36A, XOR gate 24A, multiplexer 28A, and register 26A are wider to allow parallel operation and thus speeds up the implementation. For example, if the first code was for SF=16 and the switch buffers 20A-20B, register 36A, XOR gate 24A, multiplexer 28A, and register 26A were 16 bits wide, the number of clock cycles required to determine all the OVSF codes would be reduced by a factor of 16. A multiplexer 54 allows selectively reading out of the different codes generated and stored in different buffers 20A and 20B. Further, a multiplexer 50 allows selection between the switch buffers 20A and 20B.

For FIG. 7, the SF=8 values are not specifically shown as in FIG. 6, illustrating that the configuration can be used with other SF values than SF=8. Further, for illustration a channel code table 37 is provided to select the required code bit k for data that is generated in either register 20A or 20B. Using the channel code table 37 a selected row from one of buffers 20A or 20B can be written, while a different row is being read out through multiplexer 54.

This channel code table 37 can be indexed to support multiple users. For example, if 64 users are on a system with a SF of 512, the users could all be sourced from a 512 bit storage. The code table in one embodiment could be 8 bits wide and 64 bits deep, with a system sourced from code SF=8 and operating at a SF value of 512. In this example, if the first user requires code k=19 at time=0, row 0 of the code table 37 would hold the value 19 for the first user. After 64 clock cycles code k=0 of SF=512 is stored in shift register 20A. On the following clock cycle, buffer 20A is addressed by the code table 37. As the code table 37 is sourced from code SF=8 it is 8 bits wide and 64 bits in depth. Therefore the three least significant bits of the output of the code table 37 are used the select one bit from the 8 bit wide register 20A. In this example the index value would be 3. The 6 most significant bits of the output from code table 37 are used to select the correct bit of the 64 deep register 20A. In this example, bit 2 would be selected. Output multiplexer 54 would be set to select the output from 20A. Feedback multiplexer 50 would be set to select the output from 20B as this is being used to generate the next code k=1 for SF=512.

On the following cycle, a second user required code from the table 37 is accessed. Assuming the second user requires k=437, the second row of the code table 37 will be set to 437. In this example, this would select bit 5 of row 54 of the 8 wide register 20A. This is repeated for all 64 users and thus requires 64 clocks. After this time register 20B now contains code k=1 SF=512 and this is then used to provide the outputs for time t=1. The indexed codes can be updated by either loading the code table 37 using external processor (not shown) or alternatively by generating the codes within the FPGA.

Using embodiments of the present invention as described, a Xilinx FPGA that includes Shift Register Look up tables 16 bits long (SRL16) can be used to efficiently implement the shift registers required. For 3G Mobile HSDPA HS-SCCH, SF=128 and all channels are transmitted using the same time offset. With the SRL16s used, 16 blocks would be needed for a 3G Mobile system, as compared to the previous memory size of 256 K or 16 BRAMs. This supports double buffering SRL16s, as illustrated in FIG. 7.

Figure 8:
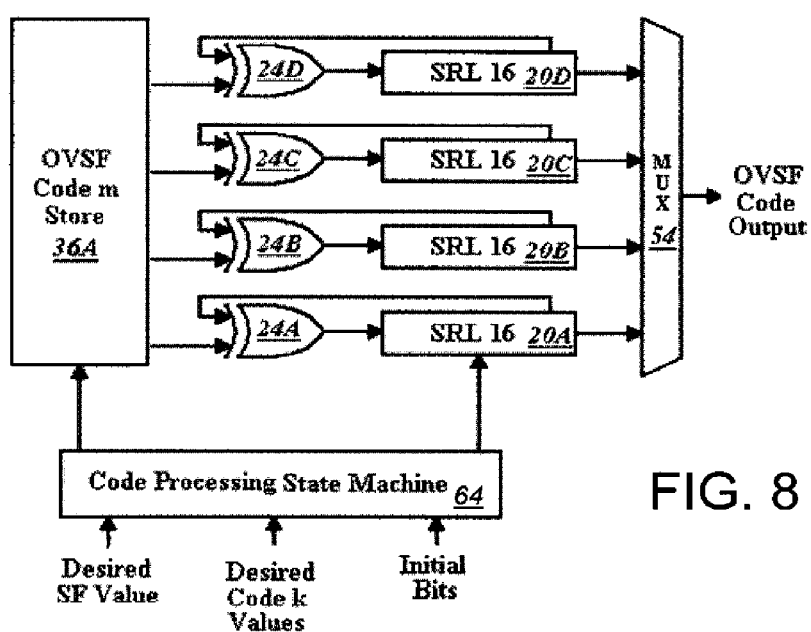
FIG. 8 illustrates a further embodiment of the present invention using SRL 16 shift registers.

FIG. 8 illustrates a further embodiment of the present invention using SRL 16 shift registers. In FIG. 8, four shift registers 20A-20D are used. In one embodiment, the registers 20A-20D can be double buffered, similar to the registers 20A-20B in FIG. 6. FIG. 8 also includes four separate XOR gates 24A-24D to accommodate the shift registers 20A-20D. Although components are shown to generate four separate OVSF code k values, more parallel devices could be included if available in the FPGA architecture. As in FIG. 7, in FIG. 8 a multiplexer 54 is connected to the outputs of the shift registers 20A-20D to selectively provide one of the OVSF code k outputs generated. The code m storage is provided by a combined storage device 36A functioning as in FIG. 7.

In FIG. 8, a code processing state machine 64 serves as the Addess LUT 30, and count block 38, channel code table 26 and register 27, as well as a counter of FIG. 7. The state machine 64 provides control signals to select the tap from shift registers 20A-D, to shift the registers 20A-D, and to select appropriate code m values from code store 36A. Inputs to the code processing state machine include the code k values and SF level for the desired codes to be generated. When the required SF level is less then the calculated level, the required code k must be post concatenated with zeroes in order to select the correct code bit. A initial bit is also provided to the state machine 64. The initial bit can be provided from a code table storage device and retrieved by the code processing state machine. Normally, the function will commence at time t=0 therefore code k=0 is required for the initial bits. This code is always all "1s".

Although the present invention has been described above with particularity, this was merely to teach one of ordinary skill in the art how to make and use the invention. Many additional modifications will fall within the scope of the invention, as that scope is defined by the following claims.

What is claimed is:

1. An apparatus for determining an Orthogonal Variable Spread Factor (OVSF) code, the apparatus comprising:
    a storage register for storing a bit of the OVSF code, wherein the OVSF code has a value k, wherein k is an integer ranging from 0 to SF−1, where SF is a spread factor for the given code k;
    a logic gate for performing a multiplication operation, the logic gate having a first input receiving the bit from the storage register, and a second input connected to receive a secondary code from a secondary code register, the secondary code register storing secondary codes for SF values associated with the value k, the secondary code comprising a binary value indicative of a change in OVSF code values of the OVSF code generated for particular SF values below the SF value of the code generated at an output of the logic gate, wherein the result of the multiplication operation comprises a portion of the OVSF code and is based upon the OVSF code values for SF values before the SF value for the result of the multiplication operation; and
    a shift register having an input receiving the output of the logic gate.

2. The apparatus of claim 1, wherein the logic gate comprises an exclusive OR (XOR) gate.

3. The apparatus of claim 1, further comprising:
    a counter; and
    a multiplexer, the multiplexer having a first input connected to an output of the storage register, a second input connected to a tap from the shift register, and an output provided as the first input of the logic gate, the counter providing a select signal to provide the storage register bit at its output on an initial count from the counter, and to provide the tap from the shift register at its output during subsequent counts from the counter.

4. The apparatus of claim 3, further comprising:
    an address look up table (LUT), the address LUT providing a control signal to the shift register to select a bit of the shift register to provide from the tap, the address LUT having an input connected to the counter and functioning to change the tap depending on the count.

5. The apparatus of claim 4, wherein a location of the tap varies between a bit 0, and bits indicated by (SF−1), wherein SF ranges from 2 to a value before an SF value of a currently generated OVSF code.

6. The apparatus of claim 1, wherein the secondary code storage register stores code values m indicating particular SF values that are at and below the SF value of the currently generated OVSF code.

7. The apparatus of claim 6, wherein the particular SF values range from 2 to an SF value for the given code k, wherein a code value m for one of the particular SF values is indicative of the OVSF code for the one of the particular SF values.

8. An apparatus for determining Orthogonal Variable Spread Factor (OVSF) codes comprising:
    a plurality of shift registers;
    a secondary data memory for storing multiplier values enabling generation of the OVSF codes; and
    a means for multiplying having first inputs connected to a tap output from a bit of each of the plurality of shift registers and second inputs connected to receive a bit from the secondary data memory which is indicative of a change in code values of the OVSF codes generated for a particular SF value of the OVSF codes, the means for multiplying providing an input to each of the plurality of shift registers, wherein the output of the means for multiplying comprises portions of OVSF codes based upon OVSF code values for SF values before the particular SF value of the OVSF codes output by the means for multiplying.

9. The apparatus of claim 8, wherein the means for multiplying comprises XOR gates, each XOR gate having a first input provided from the tap output from one of the shift registers, and a second input provided from an output of the secondary data memory.

10. The apparatus of claim 8, further comprising:
    a counter; and
    a state machine connected to the plurality of shift registers and the counter, the state machine providing a signal to select the bit provided from the tap output of each of the shift registers.

11. The apparatus of claim 8, further comprising:
    a code value memory table for storing user desired code values for accessing the shift registers to enable providing a desired OVSF code as an output of the apparatus.

12. The apparatus of claim 8, wherein each of the plurality of shift registers stores a different code value k, wherein k is an integer ranging from 0 to SF−1, where SF is a spread factor for the given code k.

13. The apparatus of claim 1 wherein the apparatus is an integrated circuit.

14. The apparatus of claim 13 wherein the integrated circuit is a field programmable gate array.

15. A method for determining an Orthogonal Variable Spread Factor (OVSF) code, comprising:
    receiving an initial bit of a given OVSF code, wherein the given OVSF code has a value k, wherein k is an integer ranging from 0 to SF−1, where SF is the spread factor for the given OVSF code;
    shifting the initial bit to a second bit; and
    multiplying the initial bit by an initial secondary code bit from a secondary code register, the secondary code register storing secondary code bits for SF values associated with the value k, the initial secondary code bit having a first value m, and storing a multiplication result as a first bit, wherein m is an integer corresponding to particular SF values ranging from 2 to the SF value for the given OVSF code and the value k of the given OVSF code, and wherein the initial secondary code bit indicates changes in OVSF codes generated for an SF value below a particular SF value of the given OVSF code, wherein the multiplication result comprises bits of the given OVSF code for the particular SF value.

16. The method of claim 15, further comprising:
    shifting the first bit and the second bit into a third bit and a fourth bit respectively, and multiplying the first bit and the second bit by a secondary code bit having a second m value and storing the result as the first bit and the second bit.

17. The method of claim 15, wherein the first and second bits are provided in one of a plurality of registers, the method further comprising:

receiving an OVSF code k value for a desired OVSF code;

selecting bits from the one of the plurality of registers to provide to a user depending on the OVSF code k value received.

* * * * *